United States Patent
Hamel et al.

[11] Patent Number: 5,771,112
[45] Date of Patent: Jun. 23, 1998

[54] RECONFIGURABLE DEVICE FOR INSERTION-EXTRACTION OF WAVELENGTHS

[75] Inventors: André Hamel, Lannion; Daniel Laville, Perros Guirec, both of France

[73] Assignee: France Telecom, Paris, France

[21] Appl. No.: 665,798

[22] Filed: Jun. 17, 1996

[30] Foreign Application Priority Data

Jun. 21, 1995 [FR] France ................... 95 07412

[51] Int. Cl.⁶ ............................... H04J 14/02
[52] U.S. Cl. .................. 359/128; 359/127; 359/130
[58] Field of Search .................... 359/127, 128, 359/130, 124; 385/37

[56] References Cited

U.S. PATENT DOCUMENTS

| | | | |
|---|---|---|---|
| 5,488,500 | 1/1996 | Glance | 359/130 |
| 5,550,818 | 8/1996 | Brackett et al. | 359/124 |
| 5,566,014 | 10/1996 | Glance | 359/128 |
| 5,612,805 | 3/1997 | Fevrier et al. | 359/128 |
| 5,633,741 | 5/1997 | Giles | 359/127 |

FOREIGN PATENT DOCUMENTS

| | | |
|---|---|---|
| 0410712 | 1/1991 | European Pat. Off. . |
| 0655632 | 5/1995 | European Pat. Off. . |

OTHER PUBLICATIONS

Discovering a New World of Communications, Chicago, Jun. 14–18, 1992, "Multiwavelength Ring Network for Switch . . . ", Wagner et al, ICC 92, pp. 1173–1179.
Twelfth Annual Conference on European Fibre . . . , "WDM–SDH Networks: An alternative to SDH rings", Jun. 1994, Switzerland, pp. 98–101., Hamel et al.
OFC '95, "Tunable optical add/drop filter", Jul. 1995, Washington, D.C., Glance et al, pp. 85–87.
A.F. Elrefaie, "Multiwavelength survivable ring network architecture", Bellcore ICC 93.
A.F. Elrefaie et al., "Fibre amplifiers in closed ring WDM networks", Electron. Lett., vol. 28, pp. 2340–2341, 1992.
J.L. Archambault et al., "Novel channel dropping filter by grating frustrated coupling in single mode optical fiber", OFC'94, p. 51.
U.S. Serial No. 08/609,519, filed Mar. 1, 1996, High Isolation, Optical Add–Drop Multiplexer, Andre Hamel et al.

Primary Examiner—Leslie Pascal
Attorney, Agent, or Firm—Pearne, Gordon, McCoy and Granger LLP

[57] ABSTRACT

This device includes optical add-drop multiplexers (M1 to M2) each having a band-pass filter. An optical switch (C1) has outputs connected to the multiplexers. An optical coupling (C2) has inputs connected to the multiplexers. The device is useful in optical communications.

8 Claims, 4 Drawing Sheets

RECONFIGURABLE DEVICE FOR INSERTION-EXTRACTION OF WAVELENGTHS

DESCRIPTION

1. Technical Field

This invention relates to a reconfigurable device for the insertion and the extraction of wavelengths.

It is applicable particularly in the field of optical telecommunications.

2. State of the Prior Art

Great progress has been made in fibre optic transmission systems and has enabled a range of 90 km to be obtained for industrial systems at 2.5 Gbit/s, with standard optical fibres.

Fibre optic amplifiers have allowed an increase in this range up to several hundred kilometres.

The capacity of a transmission system can be increased by time multiplexing or by wavelength multiplexing.

It is then technically possible to set up transmission highways, with high throughput over large distances.

But, in medium size countries, such as European countries, it is interesting, from an economic point of view, to set up a branch line from a high throughput highway to serve a large conurbation.

The line equipment then has a lower throughput.

Wavelength multiplexing linked to devices which allow diversion of a wavelength and the insertion of one have undoubted interest.

Such a technique is also of interest in ring architectures since the optical components allow the transmission of signals by spectral routing.

For this subject, reference is made to document (1) which, like other documents quoted below, is listed at the end of this description.

Devices which permit the separation of wavelengths are already known.

These known devices use diffraction gratings and allow the separation of from four to twenty wavelength channels.

For these devices the insertion losses are between 2.5 dB and 4 dB.

It is possible to carry out an extraction then an insertion by a back to back assembly of two devices of the same kind.

For this subject, reference is made to document (2).

However, all of the channels are subject to the same insertion losses, of the order of 5 to 6 dB.

Each channel has a pass-band transfer function which is relatively narrow and whose template is of the sinusoidal type.

This means that the losses are minimal at the central wavelength and that these losses increase as the distance from this central wavelength increases.

In the current state of the technology, the mid-height width of a transmission channel is 0.8 nm for a distance between channels of 4 nm.

This characteristic requires precise positioning of the wavelength of the sources and the transfer function is reduced by the cascading of the known devices, mentioned above.

DISCLOSURE OF THE INVENTION

This invention relates to a reconfigurable device for the insertion and the extraction of wavelengths, which has less optical losses than a reconfigurable device produced using the known devices mentioned above.

More precisely, this invention relates to a reconfigurable device for the insertion and the extraction of wavelengths, characterised in that it includes:

a plurality of optical add-drop multiplexers each having an input, an output, an insertion input and an extraction output, a main optical selector switch with at least M positions, where M is the number of optical add-drop multiplexers, this main optical switch having an input and a plurality of outputs, each position allowing the connection of one of these outputs to said input of one of the optical add-drop multiplexers, a means of optical coupling having an output and a plurality of inputs, respectively connected to said outputs of the optical add-drop multiplexers, and in that each optical add-drop multiplexer includes:

a first optical means forming a band-pass filter, capable of directing, to the extraction output of the multiplexer, an optical signal among a group of optical signals with wavelengths differing from one another, arriving at said multiplexer input, and a second optical means which receives the other signals from the group and which is capable of inserting into them an optical signal coming from the insertion input of the multiplexer, these other signals and the inserted signal being sent to said multiplexer output.

According to a first particular embodiment of the device which is the object of the invention, the first and second optical means include multi-dielectric pass-band filters centred on the same wavelength.

According to a second particular embodiment, the first and second optical means include photo-induced Bragg grating filters.

The device, object of the invention can further include rest means provided to prevent the extraction of signals from the optical add-drop multiplexers.

In a first particular embodiment, the rest means include:

a first optical coupler having an input, a first output connected to the input of the main optical selector switch and a second output, a second optical coupler having an output, a first input connected to the output of the optical coupling means and a second input and, a two position optical switch which connects the second output of the first coupler to the second input of the second coupler and which, in one position, is capable of allowing the light coming from this second output to pass so that it reaches this second input and, in the other position, prevents this light from passing, and the main optical switch has, in addition, an extra position in which no light reaching the input of this main switch is able to reach the multiplexers.

In a second particular embodiment, the rest means include:

a first optical switch having first and second positions and having an input, a first output connected to the input of the main optical switch and a second output, and a second optical switch having first and second positions and having a first input connected to the output of the optical coupling means, a second input connected to the second output of the first switch and an output.

When the first and second switches are in their first position, the light reaching the input of the first switch reaches the input of the main switch and the light reaching the first input of the second switch reaches the output of it, whereas when they are in their second position, the light reaching the input of the first switch is sent to the second input of the second switch.

The optical coupling means can be an optical coupler of the M to 1 type.

Alternatively, in place of the M to 1 type of optical coupler, a secondary optical switch with M positions is used, this optical secondary switch having M inputs and one output, each position allowing connection of one of these M inputs to the output of this secondary switch.

Hence one has less optical losses than with the optical coupler of the M to 1 type.

BRIEF DESCRIPTION OF THE DRAWINGS

This invention will be better understood by reading the description of examples of embodiments given below, purely for information purposes and in no way limitative, whilst referring to the appended drawings in which.

DETAILED DISCLOSURE OF PARTICULAR EMBODIMENTS

Figure 1:
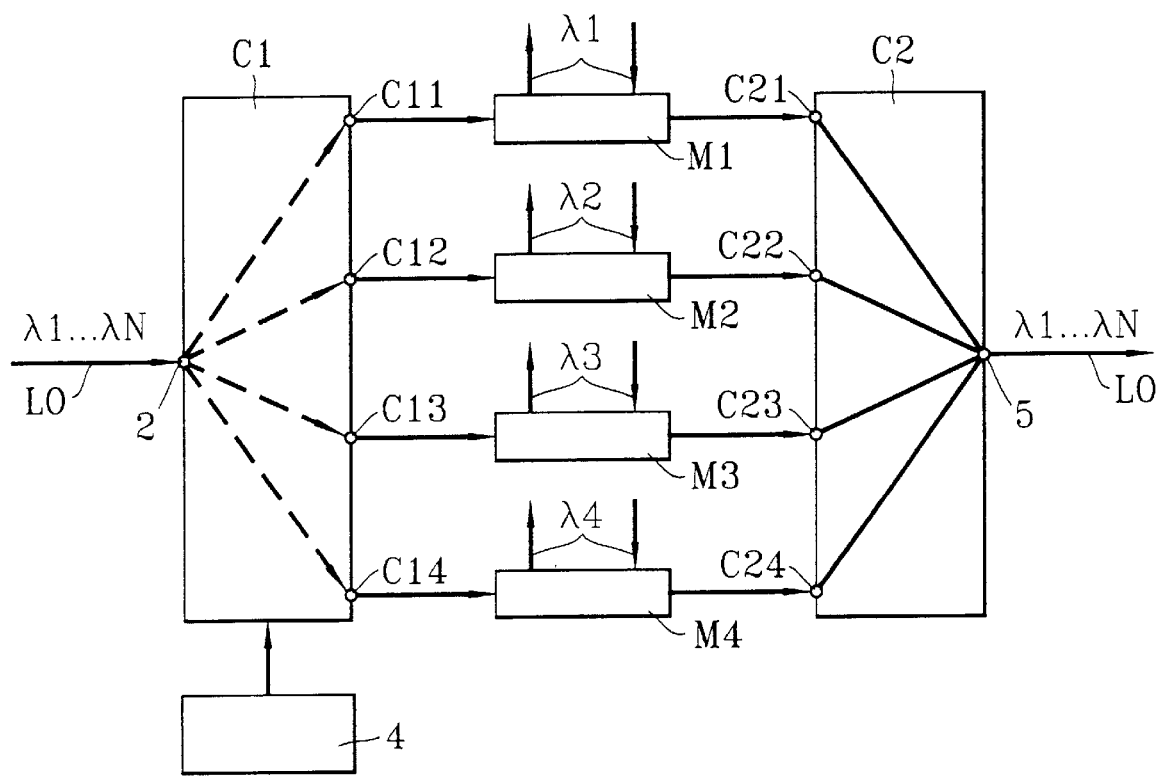
FIG. 1 is a diagrammatic view of a particular embodiment of the reconfigurable device, object of the invention.

The device conforming to the invention, which is diagrammatically shown in FIG. 1, is intended to extract from a group of optical signals, and to insert into this group of signals, an optical signal having a specific wavelength chosen from among the wavelengths of the signals in the group with the possibility of changing this chosen wavelength.

The wavelengths of optical signals considered, belong to a group of wavelengths $\lambda 1 \ldots \lambda N$, where N is a whole number greater than 1.

In the example shown in FIG. 1, the number N is greater than or equal to 4 and the device allows one to choose the wavelength of the signals to be inserted and the signals to be extracted from among the wavelengths $\lambda 1, \lambda 2, \lambda 3$ and $\lambda 4$.

The device in FIG. 1 includes optical add-drop multiplexers which are four in number and have respectively reference numbers M1, M2, M3 and M4.

Figure 2:
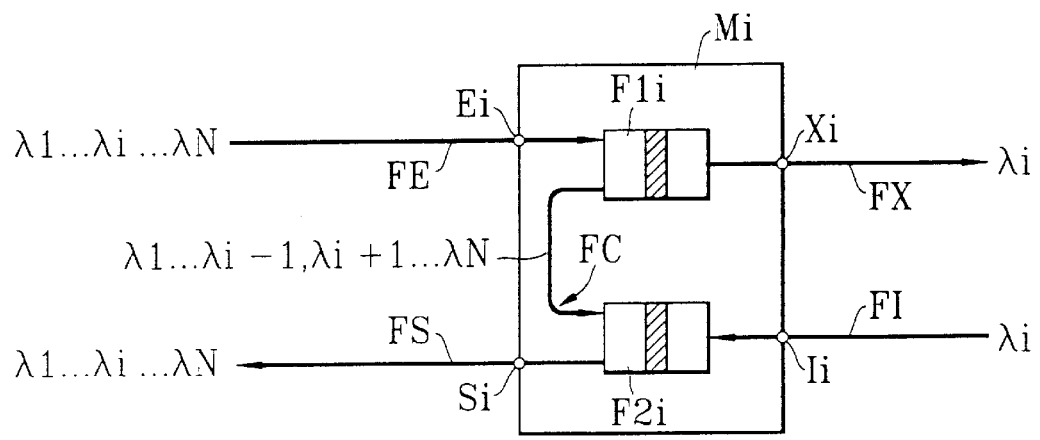
FIG. 2 is a diagrammatic view of an optical add-drop multiplexer usable in the device of FIG. 1.

As may be seen in FIGS. 1 and 2, each of the multiplexers Mi ($1 \leq i \leq 4$), has an input Ei, an output Si, an insertion input Ii and an extraction output Xi.

The device in FIG. 1 also includes an optical switch C1 having an input referenced 2 and as many outputs as there are multiplexers, that is to say four, in the example shown.

This switch C1 is a four position switch.

It is controlled by control means referenced 4 which allow selection of one of the four positions, that is to say, to connect input 2 of switch C1 to that one of the outputs of this switch that has been chosen.

The outputs C11, C12, C13 and C14 of the switch C1 are connected respectively to inputs E1 to E4 of the multiplexers.

The device in FIG. 1 also includes an optical coupler, referenced C2 having as many inputs as there are multiplexers (that is to say four inputs) and an output 5.

Hence in the example shown, we are concerned with a type 4 to 1 optical coupler.

The inputs C21, C22, C23 and C24 of coupler C2 are connected respectively to outputs S1 to S4 of multiplexers M1 to M4.

The device in FIG. 1 is installed in optical transmission line LO.

Signals of wavelengths $\lambda 1 \ldots \lambda N$ travel along this optical transmission line.

FIG. 2 shows the structure of each multiplexer Mi ($1 \leq i \leq 4$).

On this subject, reference is made to document (3).

As may be seen in FIG. 2, each multiplexer Mi includes a first multi-dielectric pass-band filter F1i and a second multi-dielectric pass-band filter F2i.

The filter F1i is optically coupled at a point Ei (input of multiplexer Mi), by an optical fibre FE, to the corresponding output of the switch C1 in order to receive the signals of wavelengths $\lambda 1 \ldots \lambda N$ likely to arrive at this corresponding output.

The filter F1i is centred on the wavelength $\lambda i$ that one wishes to extract with the multiplexer Mi and transmits the incident signal of wavelength $\lambda i$ (signal to be extracted).

When it reaches output Xi of the filter F1 i (extraction output of the multiplexer Mi), this signal thus transmitted, is sent by means of fibre FX, to means, not shown, which process the extracted signal.

The other incident signals, of wavelengths $\lambda i \ldots \lambda i-1$, $\lambda i+1 \ldots \lambda N$, are reflected by the filter F1i and sent, through an optical fibre FC, to the second filter F2i.

This filter F2i has the same spectral characteristics as filter F1i.

It is to be understood that filter F2i is centred on the same wavelength $\lambda 1$ as filter F1i and has the same pass band as the latter.

Hence this filter F2i reflects incident signals of wavelengths $\lambda i \ldots \lambda i-1, \lambda i+1 \ldots \lambda N$.

These signals reflected by the filter F2i leave the latter at a point Si (output of multiplexer Mi) and are transmitted to the corresponding input of coupler C2 through fibre FS.

Filter F2i is connected, on the one hand, to fibres FC and FS and, on the other hand, it is connected to an optical fibre FI at a point Ii (insertion input of multiplexer Mi).

An optical signal of wavelength $\lambda i$ that one wishes to insert among the other signals propagates in this fibre FI.

This signal of wavelength $\lambda i$ arises from generation means not shown.

The signal to be inserted, of wavelength $\lambda i$, is transmitted via filter F2i and is inserted among the other signals in fibre FS and, with them, reaches the corresponding input of coupler C2 to then be passed into line LO.

It should be made clear that the insertion losses for the transit channels ($\lambda 1 \ldots \lambda i-1, \lambda i+1 \ldots \lambda N$) are 1 dB and that the insertion loss for the extraction or insertion route is 1.5 dB.

The transfer function of the filters has a "gauge" which depends on the number of cavities these filters have.

For example, with three cavity filters, a flat pass band of about 5 nm can be obtained.

In an alternative form not shown, the filter F2i in FIG. 2 is replaced by an optical coupler having three branches, respectively coupled to fibres FC, FS and FI and capable of passing signals propagating in fibre FC into fibre FS and also of passing signals propagating in fibre FI into this fibre FS.

According to the selected position of switch C1, the signals arriving at the input reach the multiplexer corresponding to this position and signals whose wavelength corresponds to this multiplexer can then be inserted and extracted.

By changing the position, one may insert and extract signals of another wavelength (still chosen from among $\lambda 1$ to $\lambda 4$).

In an alternative, not shown, of FIG. 1, the device has a neutral position with respect to wavelengths transmitted on the main fibre LO.

In this case, one of the multiplexers M1 to M4 is eliminated and the corresponding output from the switch C1 is directly connected to the corresponding input of coupler C2.

Figure 3:
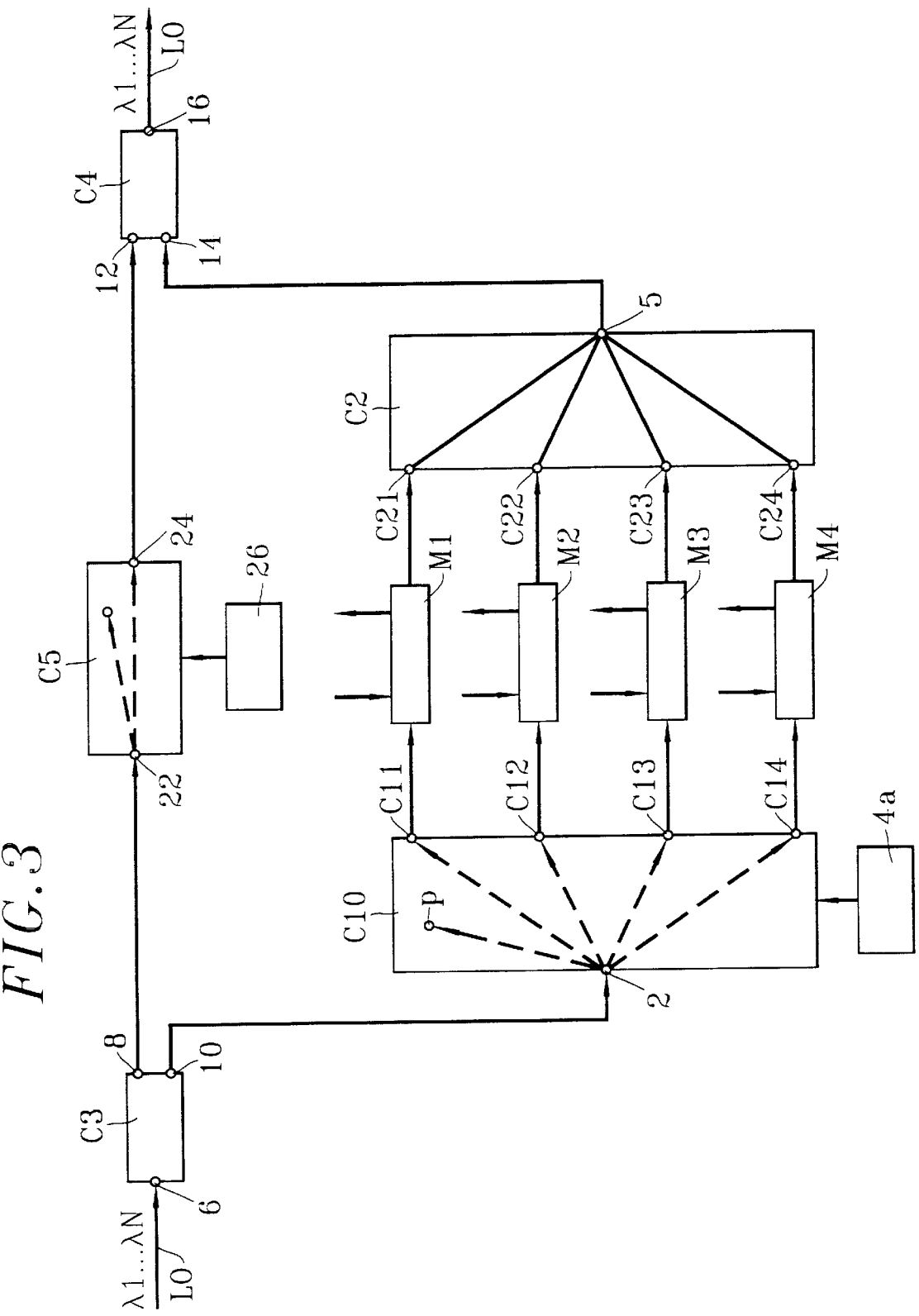
FIG. 3 is a diagrammatic view of another particular embodiment having an at rest position.
Figure 4:
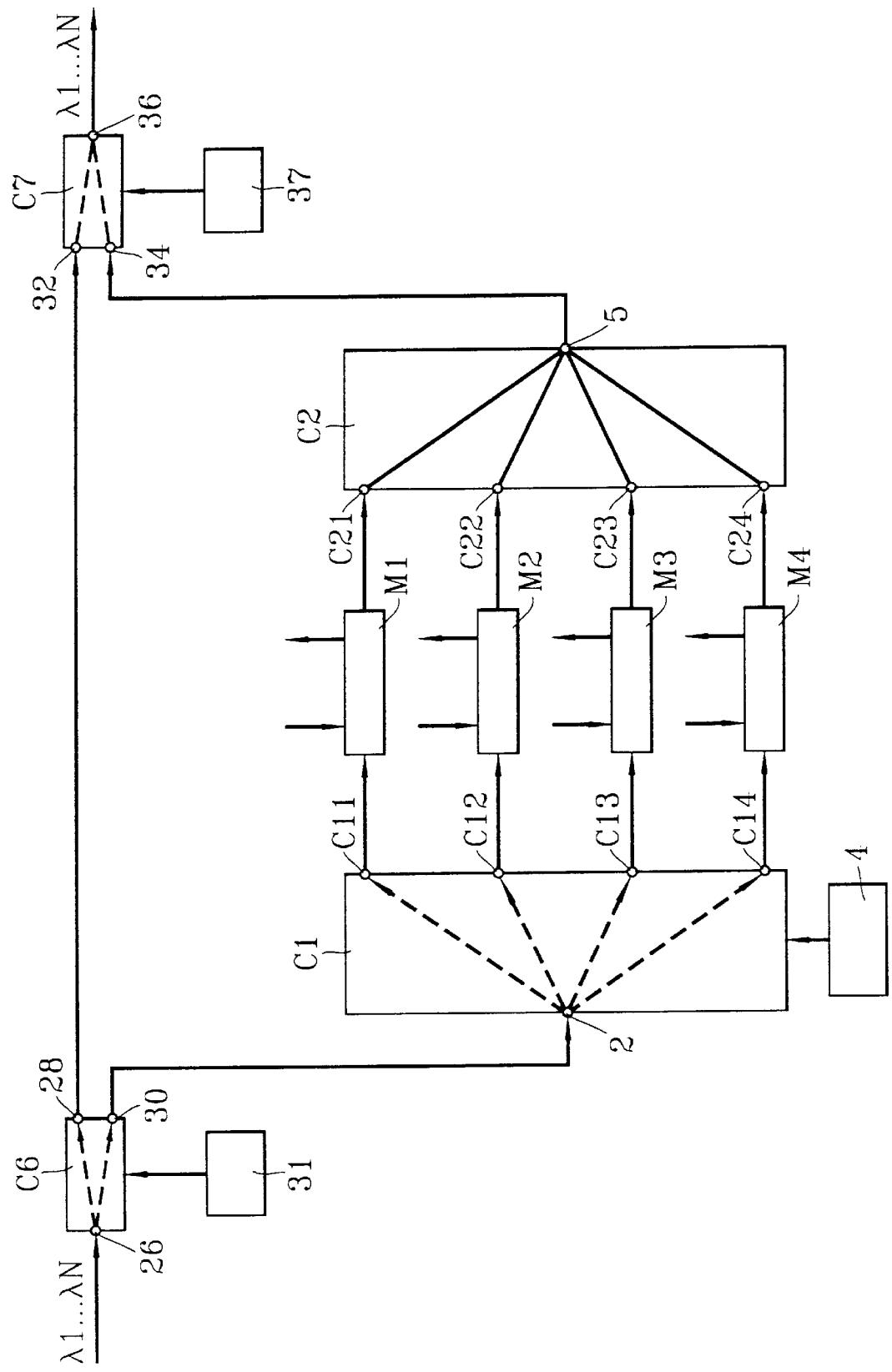
FIG. 4 is a diagrammatic view of an alternative of the device of FIG. 3

FIGS. 3 and 4 relate to devices conforming to the invention which have an at rest position, in which no wavelength is diverted by the multiplexers.

The device conforming to the invention, diagrammatically shown in FIG. 3, differs from that in FIG. 1 in that it includes, additionally, two extra optical couplers C3 and C4 and one extra optical switch C5.

The coupler C3 has an input, referenced 6 and two outputs referenced 8 and 10.

The coupler C4 has two inputs, referenced respectively 12 and 14 and one output referenced 16.

In the case of the device in FIG. 3, it is the input of coupler C3 and the output of coupler C4 which are connected to the optical transmission line LO as can be seen in FIG. 3.

The output 10 of coupler C3 is connected to the input 2 of switch C1 and the input 14 of coupler C4 is connected to the output 5 of coupler C2.

In the case of FIG. 3, the switch C1 is replaced by a switch C10 which is controlled by suitable means 4a and which has an extra position p compared with switch C1.

When switch C10 is in this extra position, it does not send any signal to multiplexers M1 to M4.

The optical switch C5 has an input 22 and an output 24.

The input 22 is connected to the output 8 of the coupler C3 and the output 24 is connected to the input 12 of the coupler C4.

The switch C5 has two positions;
one in which any signal reaching its input 22 is transmitted to its output 24 (closed state) and
the other in which no signal reaching its input 22 is transmitted to its output 24 (open state).

This switch C5 is provided with control means 26 which enable the desired position of this switch C5 to be selected.

When this switch C5 is in the open state, the signals which propagate in line LO reach switch C10 which is in one of the four positions of this switch mentioned in the description of FIG. 1.

When switch C5 is put into the closed state, switch C1 is also put into the extra p position that it has in the case of FIG. 3.

Then the incident signals from optical transmission line LO pass from coupler C3 to coupler C4 via switch C5 so as to then pass into line LO.

Hence these signals are not affected by any multiplexer.

No signal can then be extracted by any one of the multiplexers and the device of FIG. 4 is said to be in its at rest position.

The device in FIG. 4 differs from that in FIG. 1 by the fact that it also includes additionally two switches C6 and C7.

The switch C6 is a two position switch which includes an input 26 and two outputs 28 and 30.

This switch C6 is provided with control means 31 allowing it to be in one or other of the two positions.

In the first position, any signal reaching its input 26 is transmitted to its output 30.

In the second position, this incident signal reaches the other output 28.

The switch C7 is a two position switch having two inputs 32 and 34 and one output 36.

This switch C7 is provided with control means 37 allowing it to be in one or other of the two positions.

When the switch C7 is in its first position, any signal reaching its input 34 is transmitted to its output 36.

In the second position, any signal reaching input 32 is transmitted to this output 36.

In the case of FIG. 4, the optical transmission line LO is connected to input 26 of switch C6 and to the output 36 of switch C7 as may be seen in FIG. 4.

The output 28 of switch C6 is connected to the input 32 of switch C7.

The other output 30 of switch C6 is, in the case of FIG. 4, connected to the input 2 of switch C1.

The output 5 of coupler C2 is connected to the input 34 of switch C7.

In order to be able to extract signals through one of the multiplexers of the device of FIG. 4, the switch C6 is placed in the position that allows incident signals of wavelengths $\lambda 1 \ldots \lambda N$ to reach input 2 of switch C1.

Similarly, the switch C7 is put into the position that allows signals which reach output 5 of coupler C2, to arrive at the output of switch C7.

In order to put the device of FIG. 4 into its at rest position, each of the switches C6 and C7 are put into its second position.

Then, the signals transmitted by the optical transmission line LO pass from switch C6 directly to switch C7 and no signal can be extracted from any one of the multiplexers.

Figure 5:
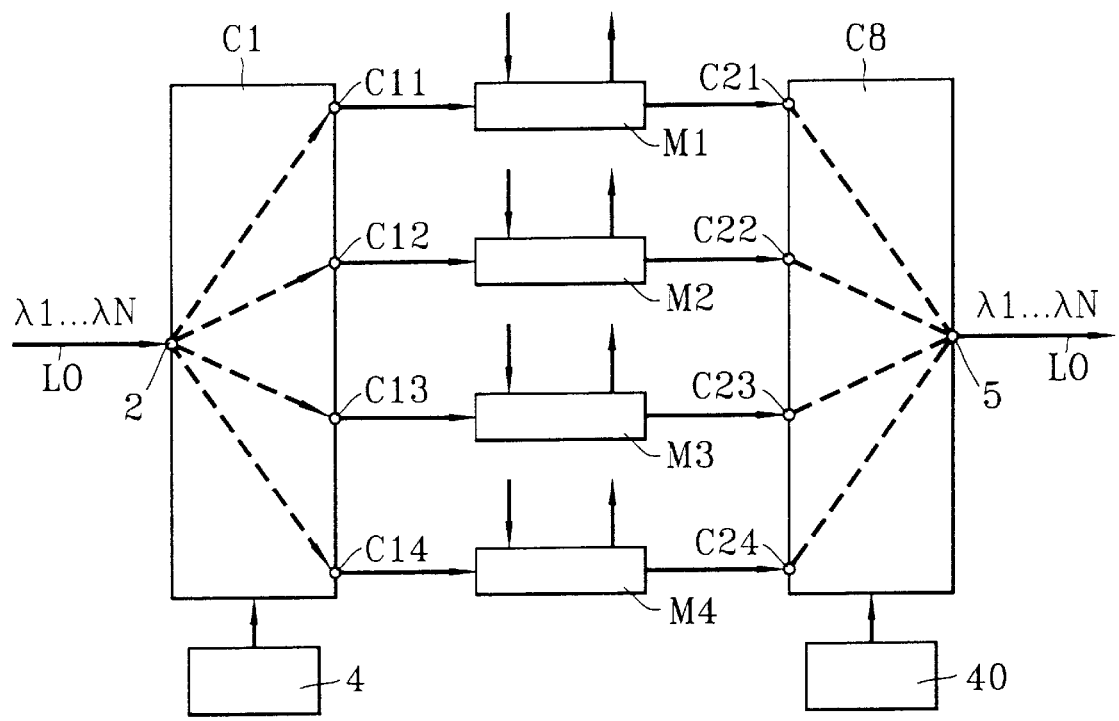
FIG. 5 is a diagrammatic view an alternative of the device of FIG. 1.

FIG. 5 illustrates diagrammatically the possibility of replacing, in the case of the devices in FIGS. 1 and 4, the coupler C2 by a four position optical switch C8, controlled by appropriate means 40.

This switch C8 has four inputs, which are referenced C21, C22, C23 and C24 and are connected respectively to four outputs of the multiplexer, and an output referenced 5 and connected to the optical transmission line LO.

The control means 40 allows communication between the output of the one of the four multiplexers that has been selected and the output of switch C8.

The use of switch C8 has the advantage of leading to a device having less optical losses than a device including the coupler C2.

For example, with a device of the type in FIG. 1 and which uses the switch C8 instead of coupler C2, the insertion losses are reduced to about 3 dB for the transit channels, without disturbance of the wavelengths since the filters have a flat response for the transit channels.

In the case of the devices in FIGS. 3 and 4, which are still using the switch C8, the insertion loss in the at rest position is 7 dB in the case of FIG. 3 and 1.5 dB in the case of FIG. 4.

This insertion loss is 10 dB in the case of FIG. 3 and 4 dB in the case of FIG. 4 when a wavelength passes through an optical multiplexer.

The multi-dielectric pass-band filters are particularly usable for producing optical add-drop multiplexers for a device conforming to the invention as long as the distance between the wavelength channels is greater than 2 nm.

For this value of 2 nm and for lower values, means other than multi-dielectric pass-band filters are preferably used to produce the multiplexers.

One can use any means having a pass-band transfer function such as, for example, photo-induced Bragg grating filters.

For this subject, reference will be made to document (4)

Figure 6:
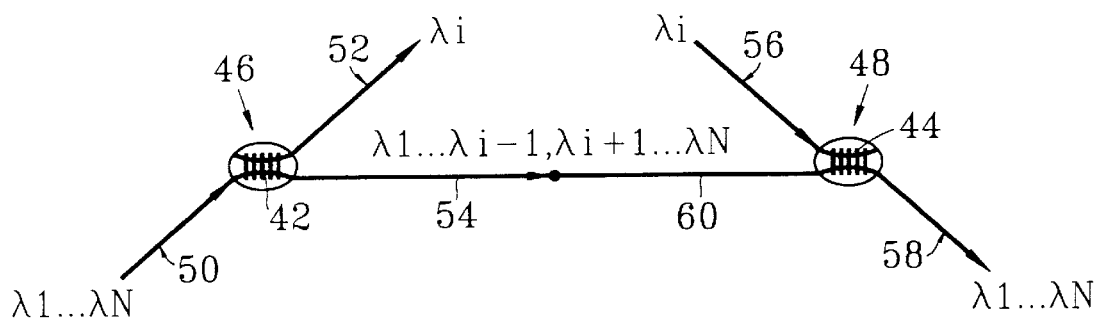
FIGS. 6 and 7 are diagrammatic views of other optical add-drop multiplexers usable in the device of FIG. 1.

FIG. 6 shows an example of an optical insertion-extraction multiplexer which is usable with the devices of FIGS. 1 to 5 and made by means of two photo-induced Bragg grating filters 42 and 44.

These filters 42 and 44 are formed respectively at the junction of the two branches of Y optical couplers respectively referenced 46 and 48, as may be seen in FIG. 6.

In this case, one of the branches, referenced 50 of the coupler 46 receives the signals of wavelengths $\lambda i \ldots \lambda N$.

One of the two other branches, referenced 52, of this coupler 46 corresponds to the extraction output of the multiplexer and transmits the extracted signal of wavelength $\lambda i$.

The third branch 54 of the coupler 46 transmits the signals of wavelengths $\lambda i \ldots \lambda i-1, \lambda i+1 \ldots \lambda N$.

In effect, the photo-induced Bragg grating filter 42 is designed to reflect the wavelength $\lambda i$ and to transmit the other wavelengths.

It is the same for the other filter 44 formed in coupler 48.

One 56 of the branches of this coupler 48 receives a signal of wavelength $\lambda i$ to be inserted.

This signal is reflected by filter 44 and passes into a second branch 58 of the coupler 48 to be inserted into the signals of wavelengths $\lambda i \ldots \lambda i-1, \lambda i+1 \ldots \lambda N$ which are also transmitted by this branch 58.

The third branch 60 of the coupler 48 is connected to the branch 54 of the coupler 46 as may be seen in FIG. 6.

Figure 7:
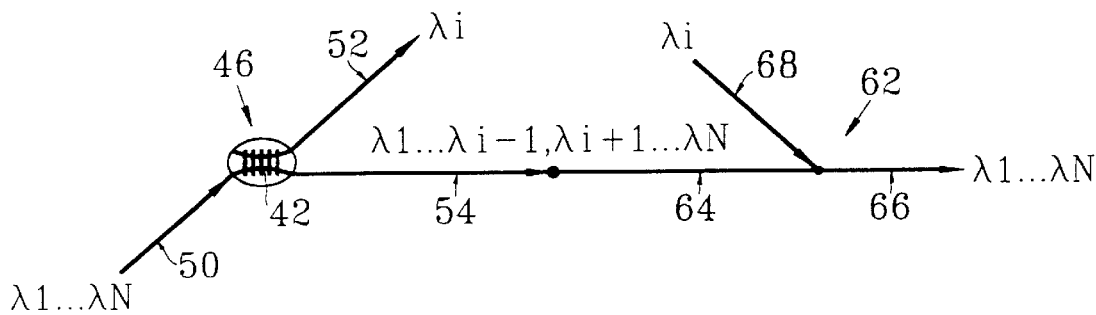

FIG. 7 is a diagrammatic view of a variant of producing the optical add-drop multiplexer shown in FIG. 6.

In this alternative form, the coupler 48 containing a photo-induced Bragg grating filter is replaced by a simple three branch coupler 62.

One 64 of the branches of this coupler is connected to the branch 54 of the coupler 46.

The second branch 66 of this coupler 62 transmits the signals of wavelengths $\lambda i \ldots \lambda N$.

The third branch 68 of this coupler 62 receives the signal of wavelengths $\lambda i$ to be inserted into the signals of wavelengths $\lambda 1 \ldots \lambda i-1, \lambda i+1 \ldots \lambda N$ propagating in the branch 54 of the coupler 46 which is connected to the branch 64 of the coupler 62.

The documents quoted in this description are the following:

(1) A. F. Elrefaie, "Multiwavelength survivable ring network architectures", Bellcore ICC 93
(2) A.F. Elrefaie et al., "Fibre amplifiers in closed ring WDM networks", Electron. Lett., vol.28, pp. 2340–2341, 1992
(3) A. Hamel, V. Tholey, M. J. Chawki, "WDM-SDH Networks: an alternative to SDH rings", EFOC&N 94, pp. 98–101
(4) J.L. Archambault et al., "Novel channel dropping filter by grating frustrated coupling in single mode optical fiber", OFC'94, p. 51.

We claim:

1. A reconfigurable device for the insertion and extraction of wavelengths, this device being characterised in that it includes:

a plurality of optical add-drop multiplexers(M1, M2, M3, M4) each having an input, an output, an insertion input and an extraction output, a main optical selector switch (C1, C10) with at least M positions, where M is the number of optical add-drop multiplexers, this main optical switch having an input and a plurality of outputs, each position allowing the connection of one of these outputs to said input of one of the optical add-drop multiplexers, a means of optical coupling (C2, C8) having an output and a plurality of inputs, respectively connected to said outputs of the optical add-drop multiplexers, and in that each optical add-drop multiplexer includes:

a first optical means (F1$i$, 42) forming a band-pass filter, capable of directing, to the extraction output of the multiplexer, an optical signal among a group of optical signals with wavelengths differing from one another, arriving at said multiplexer input, and a second optical means (F2$i$, 44) which receives the other signals from the group and which is capable of inserting amongst them an optical signal coming from the insertion input of the multiplexer, these other signals and the inserted signal being sent to said multiplexer output.

2. A device according to claim 1, characterised in that the first and second optical means include multi-dielectric band-pass filters (F1$i$, F2$i$) centred on the same wavelength.

3. A device according to claim 1, characterised in that the first and second optical means include photo-induced Bragg grating filters (42, 44).

4. A device according to claim 1, characterised in that the device includes rest means (C3, C4, C5; C6, C7) for preventing the extraction of signals by the optical add-drop multiplexers.

5. A device according to claim 4, characterised in that the rest means include:

a first optical coupler (C3) having an input, a first output connected to the input of the main optical selector switch and a second output, a second optical coupler (C4) having an output, a first input connected to the output of the optical coupling means and a second input and, a two position optical switch (C5) which connects the second output of the first coupler to the second input of the second coupler and which, in one position, is capable of allowing the light coming from this second output to pass so that it reaches this second input and, in the other position prevents this light from passing, and in that the main optical switch has, in addition, an extra position in which no light reaching the input of this main switch is able to reach the multiplexers.

6. A device according to claim 4, characterised in that the rest means include:

a first optical switch (C6) having first and second positions and having an input and a first output connected to the input of the main optical switch and a second output, and a second optical switch (C7) having first and second positions and having a first input connected to the output of the optical coupling means, a second input connected to the second output of the first switch and an output, and in that when the first and second switches are in their first position, the light reaching the input of the first switch reaches the input of the main switch and the light reaching the first input of the second switch reaches the output of said second switch, whereas when they are in their second position, the light reaching the input of the first switch is sent to the second input of the second switch.

7. A device according to claim 1, characterised in that the means of optical coupling is a type M to 1 type optical coupler (C2).

8. A device according to claim 1, characterised in that the means of optical coupling is a secondary optical switch (C8) with M positions, this secondary optical switch having M inputs and one output, each position allowing the connection of one of these M inputs to the output of this secondary switch.

* * * * *